United States Patent [19]

Okamura

[11] 4,192,224

[45] Mar. 11, 1980

[54] ROTARY MASTER CYLINDER MEANS

[75] Inventor: Hiromasa Okamura, Susono, Japan

[73] Assignee: Toyota Jidosha Kogyo Kabushiki Kaisha, Toyota, Japan

[21] Appl. No.: 858,792

[22] Filed: Dec. 8, 1977

[30] Foreign Application Priority Data

Dec. 17, 1976 [JP] Japan .................. 51-152168

[51] Int. Cl.² ............................ F15B 7/00; F15B 7/08
[52] U.S. Cl. ........................................ 92/125; 60/585; 60/581
[58] Field of Search ................ 60/585, 592, 594, 581; 92/121, 125; 417/418

[56] References Cited

U.S. PATENT DOCUMENTS

| 540,492 | 6/1895 | Humes | 92/125 |
|---|---|---|---|
| 976,907 | 11/1910 | Pagendarm | 60/581 |
| 1,577,579 | 3/1926 | Hirschler | 60/592 |
| 3,354,182 | 12/1967 | Jacoby | 60/594 |
| 3,374,628 | 3/1968 | Jacoby et al. | 60/594 |
| 3,426,652 | 2/1969 | Blake | 92/27 |
| 3,731,598 | 5/1973 | Brighon et al. | 92/121 |

FOREIGN PATENT DOCUMENTS 40368  5/1907  Switzerland .................. 60/585

*Primary Examiner*—Martin P. Schwadron
*Assistant Examiner*—A. Michael Chambers
*Attorney, Agent, or Firm*—Stevens, Davis, Miller & Mosher

[57] ABSTRACT

A rotary master cylinder means including a housing having a cylindrical bore, a rotary piston rotatably mounted in the cylindrical bore and having a peripheral recess, a dam means slidably supported by the housing and radially inserted into the recess so as to define a pressure chamber in the recess, wherein the rate of delivery of brake fluid from the pressure chamber relative to rotation of the rotary piston effected by stepping on the brake pedal can be non-linearly varied by varying radial depth of the recess in accordance with its angular position.

5 Claims, 9 Drawing Figures

ROTARY MASTER CYLINDER MEANS

BACKGROUND OF THE INVENTION

The present invention relates to a master cylinder means to be incorporated in the oil hydraulic braking system of an automobile.

Conventionally, the oil hydraulic braking system of an automobile incorporates a master cylinder means of a linear cylinder-piston type having a cylinder tube and a piston, wherein the piston is axially reciprocated in a cylinder chamber defined in the cylinder tube. When the brake pedal is stepped on, the piston is linearly shifted relative to the cylinder tube, whereby brake fluid (oil) is delivered under pressure toward brake cylinders incorporated in the braking mechanisms of individual wheels. In this conventional linear type master cylinder means, the rate of delivery of fluid relative to the amount of stepping-on of the brake pedal is substantially constant as shown by the solid line in FIG. 1. In this case, due to the incompressible character of the brake fluid (oil), the pressure generated in the braking system relative to the amount of stepping-on of the brake pedal shows a performance such as shown by the solid line in FIG. 2, wherein the pressure remains at a relatively low level when the brake pedal is stepped on starting from its completely released position until it cancels the clearance between the brake shoes and the brake drums, and when the brake shoes have all contacted the brake drums, the oil pressure begins to increase abruptly when the brake pedal is further stepped on for a relatively small amount.

Therefore, in the conventional linear type master cylinder means, the stepping-on stroke of the brake pedal is mostly consumed without imparting any substantial braking effect to the vehicle, and on the other hand in the final stage of the stepping-on stroke of the brake pedal an abruptly increasing braking action is imparted to the vehicle. Because of this braking performance, the brake pedal requires delicate operation which is very difficult for drivers, particularly beginners, to learn.

In order to obtain a desirably progressive braking effect by easy operation of the brake pedal, the oil pressure generation in the braking system relative to the amount of stepping-on of the brake pedal should have a performance such as shown by the broken line in FIG. 2. In order to obtain this performance, it is required that the rate of delivery of brake fluid relative to the amount of stepping-on of the brake pedal should have a performance such as shown by the broken line in FIG. 1. This means that in the initial stage of the stepping-on of the brake pedal, the brake fluid is delivered at a relatively high rate and the rate of delivery gradually lowers as the brake pedal is further stepped on.

SUMMARY OF THE INVENTION

It is therefore the primary object of the present invention to provide a novel master cylinder means which has a non-linear performance with regard to the delivery of brake fluid relative to the stepping-on stroke of the brake pedal.

In accordance with the present invention, the abovementioned primary object is accomplished by providing a rotary master cylinder means comprising a housing having a cylindrical bore, a rotary piston rotatably mounted in said cylindrical bore and having at least one peripheral recess, at least one dam means slidably supported in said housing and radially inserted into said recess so as to define a pressure chamber in said recess, and port means incorporated in said housing to communicate with said pressure chamber, said recess having radial depth which varies in accordance with its angular position so that the rate of change of volume of said pressure chamber relative to rotation of said rotary piston varies in accordance with the rotational angle of said rotary piston.

By judiciously designing the peripheral recess, i.e. the variation in its radial depth around its circumference, the rate of delivery of brake fluid relative to the amount of stepping-on of the brake pedal can be adjusted to show a certain desirable performance such as shown by the broken line in FIG. 1.

On the other hand, with regard to the braking force applied to the front and rear wheels of an automobile, it is known that the most stable braking of the automobile is effected when the relation between the front braking force and the rear braking force is maintained to be non-linear such as shown by the curve in FIG. 3. In the initial stage of braking the braking force applied to the rear wheels should be as great as that applied to the front wheels, but as the braking effect is gradually intensified, the braking force applied to the rear wheels should be gradually reduced relative to that applied to the front wheels. In conventional braking systems employing linear type master cylinder means, such a non-linear division of braking force between the front and rear wheels is generally performed by employing an oil pressure control valve, which is called a "proportioning valve".

In view of the aforementioned requirement with regard to the division of front and rear braking forces and the non-linear performance of the above-explained rotary master cylinder means, it is another object of the present invention to provide a master cylinder means which is capable of providing the desired division between the front and rear braking forces in addition to the above-mentioned non-linear delivery performance of brake fluid relative to the stepping-on amount of the brake pedal.

In accordance with the present invention, the above mentioned second object is accomplished by providing a rotary master cylinder means of the abovementioned structure, wherein said rotary piston has two peripheral recesses, two dam means slidably supported by said housing and radially inserted individually into said two recesses so as to define a separate pressure chamber in each of said individual recesses, said recesses having individual radial depths which vary in different manners from each other around their circumferences so that the rates of change of volume of said pressure chambers due to rotation of said rotary piston vary in different manners from each other relative to the rotational angle of said rotary piston.

In this case the two peripheral recesses may be provided as axially spaced along the axis of the rotary piston or, alternatively, they may be provided as circumferentially spaced along the periphery of the rotary piston. However, as an obvious alternative to the abovementioned rotary master cylinder means having two recesses, two of the rotary master cylinder means each having a single recess, the two recesses being of different radial depth variation around their circumferences may be employed in duplicate in a manner such that the two rotary pistons are simultaneously rotated by operation of a single brake pedal.

BRIEF DESCRIPTION OF THE DRAWING

The present invention will become more fully understood from the detailed description given herein below and the accompanying drawings, which are given by way of illustration only, and thus are not limitative of the present invention, and wherein.

DESCRIPTION OF THE PREFERRED EMBODIMENT

Figure 4:
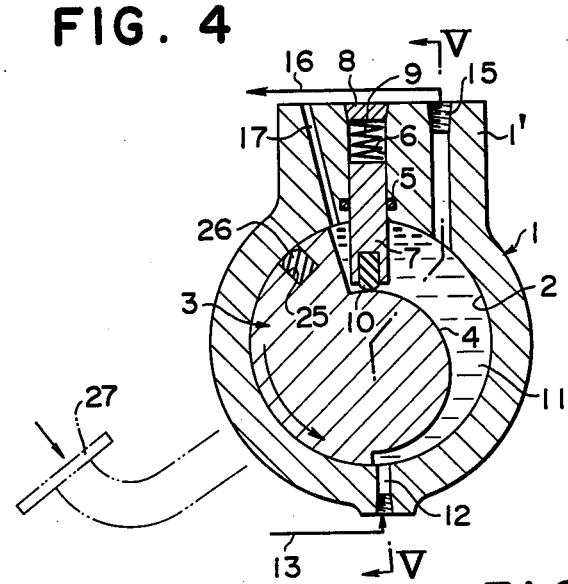
FIG. 4 is a cross-sectional view showing an embodiment of the rotary master cylinder means of the present invention.
Figure 6:
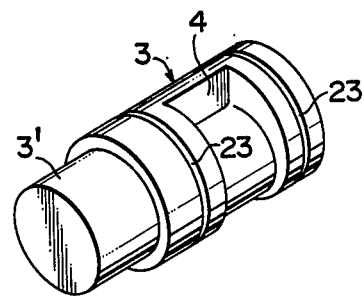
FIG. 6 is a perspective view of the rotary piston incorporated in the rotary master cylinder means shown in FIGS. 4 and 5.
Figure 5:
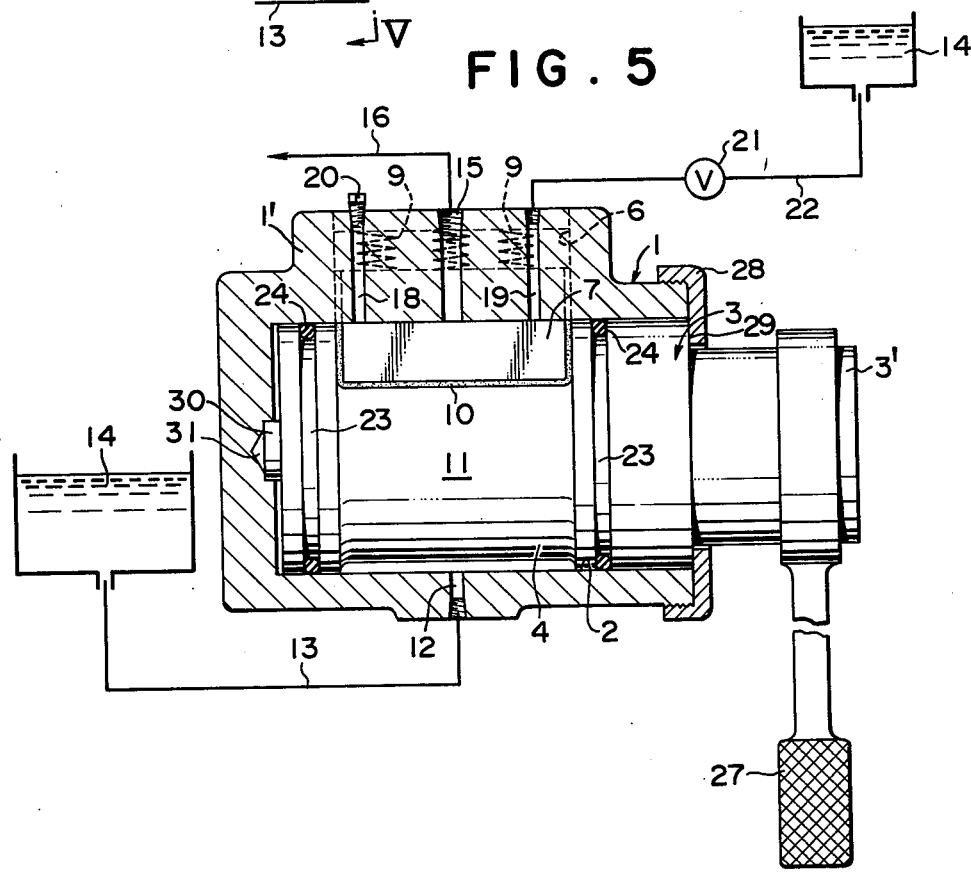
FIG. 5 is a sectional view along line V—V in FIG. 4.

Referring to FIGS. 4–6, showing a first embodiment of the present invention, 1 designates a housing having a cylindrical bore 2 defined therein. In the cylindrical bore is rotatably mounted a rotary piston 3 having a peripheral recess 4. As better shown in FIGS. 4 and 6, the peripheral recess 4 extends over about 200° of the rotary piston 3, and its bottom surface is eccentrically biased relative to the outer peripheral surface of the rotary piston. Therefore, the radial depth of the recess 4 varies in accordance with its angular position in the rotary piston, wherein as seen in the rotational direction of the rotary piston designated by an arrow in FIG. 4 the radial depth gradually decreases from its front end portion toward its rear end portion.

The housing 1 includes a head portion 1' in which is formed an elongated radial opening 6 in which is slidably received a dam element 7 formed as a plate element. Seal means 5 are provided as mounted in grooves formed in the housing so as to effect sealing between the opening 6 and the dam element 7. The dam element 7 is urged downward in the figure by compression coil springs 9 mounted between the dam element and a plug member 8 mounted to the upper end portion of the opening 6, whereby the lower end portion of the dam element is inserted into the recess 4. The lower end and opposite side end portions of the dam element 7 are provided with a seal element 10 made of a rubber elastic material and contact fluid-tightly with the bottom and opposite side walls of the recess and opposite side walls of the opening 6 thereby defining a pressure chamber 11 defined in the cavity provided by the recess 4. As apparent from this structure, the volume of the pressure chamber 11 is reduced as the rotary piston 3 rotates anticlockwise in FIG. 4 as designated by an arrow, wherein the rate of reduction of volume of the pressure chamber relative to the rotational angle of the rotary piston gradually decreases toward the end of rotation since the radial depth of the recess 4 gradually decreases toward its rear end. A port 12 is provided in the housing 1 so as to communicate to the pressure chamber 11 when the rotary piston 3 is in its full return position as shown in FIG. 4. The port 12 is connected with a passage means 13 through which is supplied brake fluid (oil) which is contained in a reservoir 14.

In the head portion 1' of the housing is formed another port 15 which constantly communicates to the pressure chamber 11 and operates as a brake fluid delivery port. The port 15 is connected with a passage means 16 which is in turn connected to the brake cylinders (not shown) incorporated in the brake mechanisms for individual wheels. Furthermore, the head portion 1' of the housing has a bleed port 17 which opens the left end portion (as seen in FIG. 4) of the recessed cavity located on the left side of the dam element 7 to the atmosphere. In the head portion 1' is further provided an air bleed port 18 for exhausting air from the pressure chamber 11, and is also provided a fluid supply port 19 for supplying brake fluid to the pressure chamber 11. The air bleed port 18 is closed by a plug 20 except when air bleeding is being effected. The fluid supply port 19 is connected with a passage means 22 including an on-off valve 21 and is supplied with brake fluid from the reservoir 14. The on-off valve 21 is closed except when the pressure chamber 11 is first filled with brake fluid.

At opposite sides of the recess 4 the rotary piston 3 is provided with peripheral grooves 23 in which are mounted O-rings 24. Furthermore, within the region delimited by the peripheral grooves 23 the rotary piston is provided with a longitudinal groove 25 in which is mounted a seal element 26 made of a rubber elastic material. It is desirable that the seal element 26 is located so that it does not traverse the port 12 even when the rotary piston 3 is rotated to its full rotation in the anti-clockwise direction in FIG. 4. The axial position of the rotary piston with respect to the housing 1 is primarily determined by the engagement of the dam element 7 to the opening 6 and to the recess 4. However, the definite positioning of the rotary piston with respect to the housing is effected by the engagement of a shoulder portion 29 of the rotary piston to a cap member 28 mounted onto an end of the housing, and the engagement of a central projection 30 to a corresponding indentation 31 formed in the housing. The rotary piston 3 has a shaft portion 3' extended through an opening formed in the cap member 28 and, in the shown embodiment, a brake pedal 27 is directly mounted to the shaft portion 3'.

Figure 1:
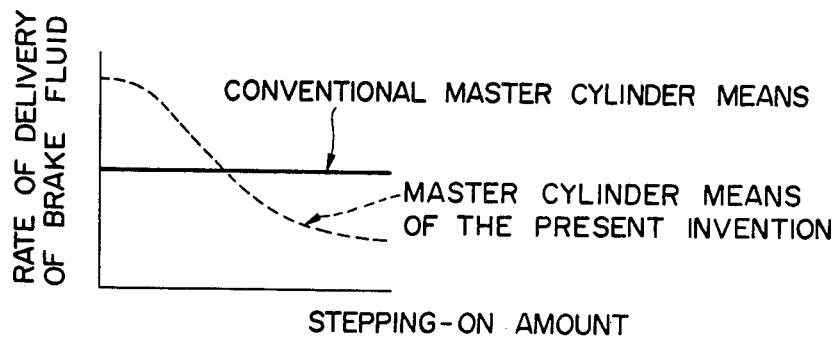
FIG. 1 is a graph showing the rate of delivery of brake fluid relative to the amount of stepping-on of the brake pedal.
Figure 2:
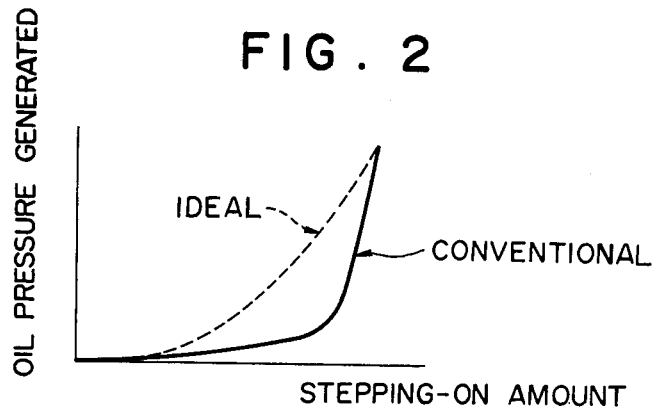
FIG. 2 is a graph showing oil pressure generated relative to the stepping-on amount of the brake pedal.

In operation, starting from a brake released condition such as shown in FIG. 4, when the brake pedal 27 is stepped on, the rotary piston 3 rotates anticlockwise as seen in FIG. 4 in the cylinder bore 2. When the rotary piston 3 has rotated through a very small angle from the position shown in FIG. 4, the port 12 is disconnected from the pressure chamber 11 and, thereafter, as the volume of the pressure chamber 11 decreases in accordance with the rotation of the rotary piston 3, the brake fluid contained in the pressure chamber 11 is delivered through the port 15 and the passage means 16 toward the brake cylinders not shown in the figure. In this delivery of brake fluid, the rate of delivery of brake fluid relative to the amount of stepping-on of the brake pedal is relatively high in the initial stage of rotation of the rotary piston and the rate gradually decreases as the rotation of the rotary piston proceeds, due to the decrease of the radial depth of the recess 4 from its forward end toward its rearward end. By judiciously designing the curve of the bottom surface of the recess 4, i.e. the cross-sectional contour of the bottom of the recess 4 as it appears in FIG. 4, a certain desirable performance curve such as the broken line in FIG. 1 is obtained with regard to the relation between the rate of delivery of brake fluid and the stepping-on amount of the brake pedal.

Figure 7:
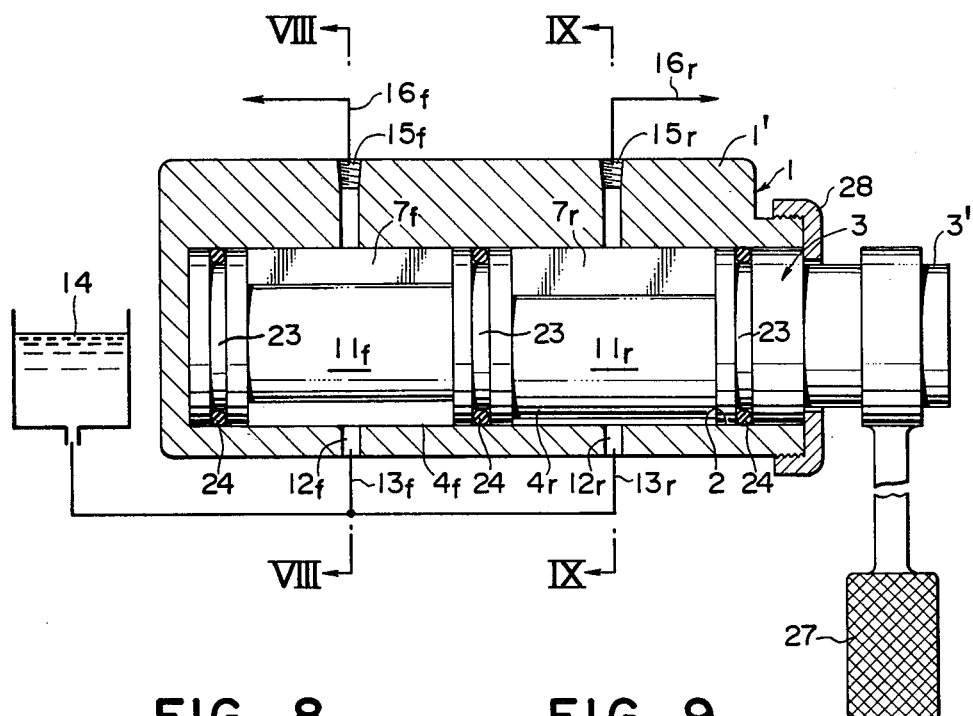
FIG. 7 is a view similar to FIG. 5, showing another embodiment of the present invention constructed as a tandem type two recess master cylinder means.
Figure 8:
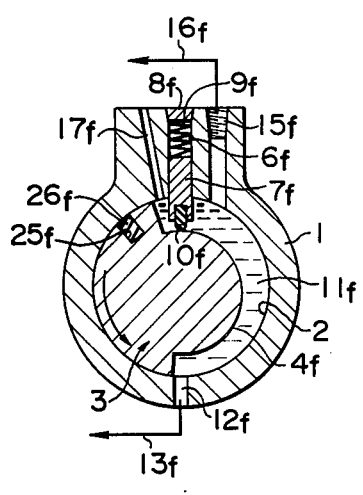
FIGS. 8 and 9 are cross-sectional views along lines VIII—VIII and IX—IX in FIG. 7.
Figure 9:
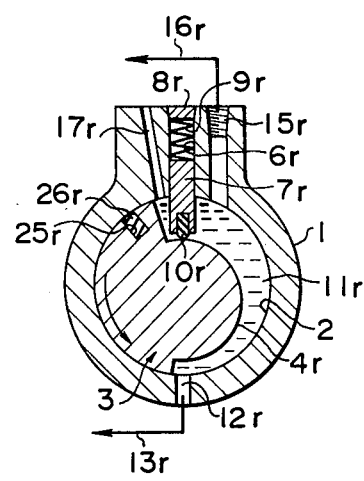

FIGS. 7-9 show another embodiment of the rotary master cylinder means of the present invention which is constructed as a tandem type master cylinder means having two pressure chambers. In these figures, the portions corresponding to those shown in FIGS. 4-6 are designated by similar reference numerals. However, since this embodiment has two separate pressure chamber structures, the portions which are provided in duplicate are designated by the same reference numerals accompanied by "f" and "r" respectively. In this connection it is assumed that the pressure chamber 11f supplies brake fluid to the brake cylinders in the front wheels, while the pressure chamber 11r supplies brake fluid to the brake cylinders in the rear wheels. As apparent from FIG. 7, the rotary piston 3 in this embodiment has two peripheral recesses 4f and 4r spaced in its axial direction, and in accordance therewith the head portion 1' of the housing 1 has two elongated openings 6f and 6r which slidably receive dam elements 7f and 7r respectively. The dam elements 7f and 7r are individually inserted into the recesses 4f and 4r, whereby pressure chambers 11f and 11r are individually defined in the recesses 4f and 4r. Ports 13f and 13r, ports 15f and 15r, and ports 17f and 17r are provided individually for the pressure chambers 11f and 11r in the same manner as in the embodiment shown in FIGS. 4-6. As assumed above, the port 15f is connected with the brake cylinders (not shown) incorporated in the braking mechanism for the front wheels by a passage means 16f, whereas the port 15r is connected with the brake cylinders (also not shown) incorporated in the braking mechanism for the rear wheels by a passage 16r.

Figure 3:
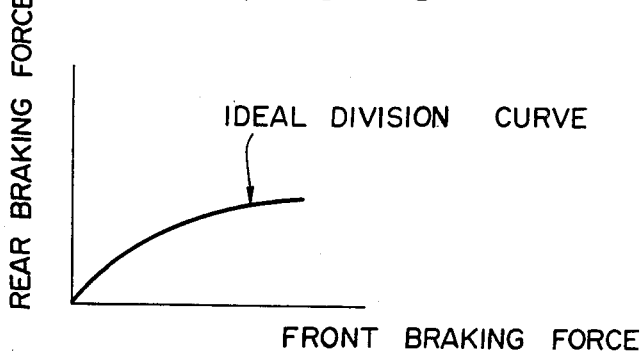
FIG. 3 is a graph showing an ideal division between front and rear braking forces.

As apparent from the comparison of FIGS. 8 and 9, the recesses 4f and 4r are designed to have different performance with regard to the variation of radial depth around their circumferences. In view of the desired relation between the front braking force and the rear braking force as shown in FIG. 3, it will be understood that the contour of the bottom surface of the recess 4r is more eccentrically biased with respect to the center of the rotary piston than that of the recess 4f. By this arrangement, when the rotary piston 3 is rotated by the stepping-on operation of the brake pedal 27, the front and rear brake cylinders are individually supplied with brake fluid in accordance with certain desirable performances such as shown by the broken line in FIG. 1 with regard to the relation between the rate of delivery of brake fluid and the stepping-on amount of the brake pedal, wherein a certain desirable division between the front braking force and the rear braking force such as shown by the ideal division curve in FIG. 3 is simultaneously accomplished.

Although the invention has been shown and described with respect to some preferred embodiments thereof, it should be understood by those skilled in the art that various changes and modifications of the form and detail thereof may be made therein without departing from the scope of the invention.

I claim:

1. A rotary master cylinder means having a non-linear pressure output in response to a linear input comprising a housing having a cylindrical bore, a rotary piston rotatably mounted in said cylindrical bore and having at least one peripheral recess, at least one dam means slidably supported by said housing and radially inserted into said recess so as to define a pressure chamber between the wall of the cylindrical bore, the dam means and the peripheral recess; port means incorporated in said housing to communicate with said pressure chamber, said recess having radial depth which varies at a regular rate of change in accordance with its angular position so that the rate of change of volume of said pressure chamber relative to rotation of said rotary piston varies in accordance with the rotational angle of said rotary piston.

2. A rotary master cylinder means having a non-linear pressure output in response to a linear input comprising a housing having a cylindrical bore, a rotary piston rotatably mounted in said cylindrical bore and having first and second peripheral and axially extending recesses each of which has two axially opposed side walls and a bottom, first and second dam means each being slidably supported by said housing and radially inserted into said first and second recesses so as individually to define, in co-operation with said housing and said two side walls and said bottom of said first and second recesses, first and second pressure chambers between the respective walls of the cylindrical bore, the respective dam means and respective peripheral recesses, port means incorporated in said housing to communicate with said respective chambers, said recesses having respective radial depths that vary at a regular rate of change in accordance with its angular position so that the rate of change of volume of said pressure chambers relative to the rotation of said rotary piston varies in accordance with the rotational angle of said rotary piston said first recess having radial depth which decreases generally more quickly in accordance with angular position than does the radial depth of said second recess.

3. The rotary master cylinder means of claim 2, wherein said rotary piston has non-recessed portions at axially opposite sides of said recesses, said non-recessed portions individually having peripheral grooves and O-rings mounted in said peripheral grooves.

4. The rotary master cylinder means of claim 2, wherein said dam means are each a rectangular plate element and said housing has a head portion having two elongated openings for slidably receiving said plate elements, said plate elements each having a seal element along its lower end portion which opposes the bottom of its recess.

5. The rotary master cylinder means of claim 2, wherein said rotary piston has an end portion axially projected from said housing, said projected portion directly supporting a brake pedal.

* * * * *